June 14, 1949.  L. H. JOHNSTON  2,473,432
ELECTRONIC SQUARE WAVE SIGNAL GENERATOR
Filed Aug. 1, 1945
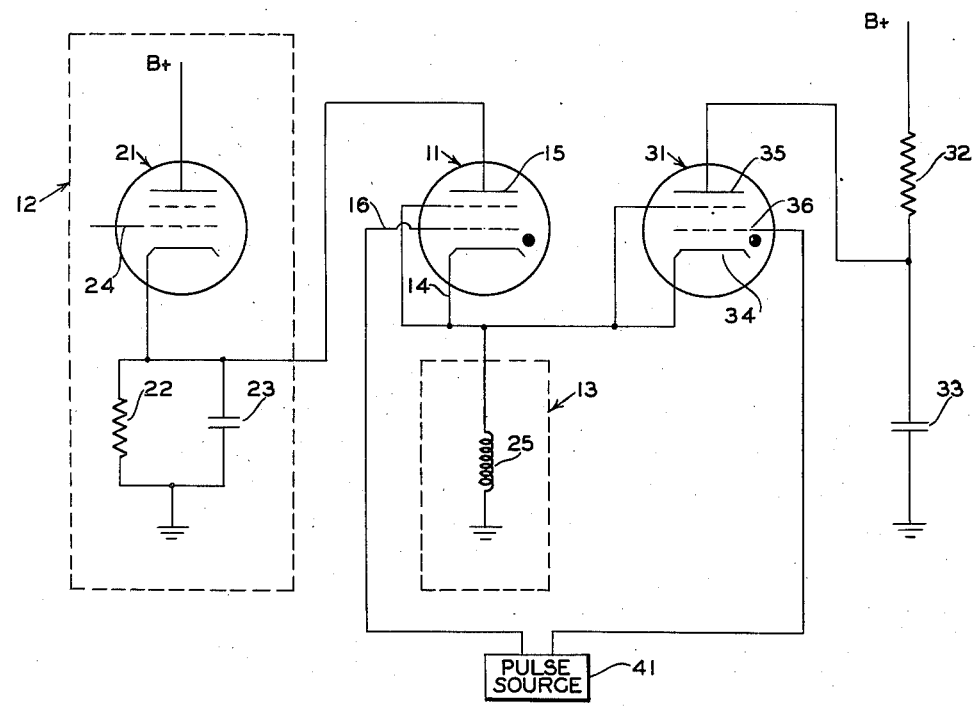
INVENTOR
LAWRENCE H. JOHNSTON
BY
*William D. Hall*
ATTORNEY Patented June 14, 1949

2,473,432

UNITED STATES PATENT OFFICE 2,473,432

ELECTRONIC SQUARE WAVE SIGNAL GENERATOR

Lawrence H. Johnston, Rural, N. Mex., assignor, by mesne assignments, to the United States of America as represented by the Secretary of War Application August 1, 1945, Serial No. 608,313

1 Claim. (Cl. 250—27)

This invention relates to signal generator circuits and more particularly to square wave generators.

According to conventional practice essentially square waveform voltages are used extensively in electronic apparatus. These square wave voltages may be used for synchronization, blanking, and for the generation of sawtooth voltages or currents for linear deflection on cathode ray tubes. Quite often it is required that the periodicity and duration of the square wave be very accurately controlled.

An object of the present invention is, therefore, to provide an improved square wave generator having an output, the periodicity and duration of which can be accurately controlled.

In accordance with the present invention, there is provided a gas switch tube interposed between a unidirectional voltage source and a load. The switch tube is actuated by a short pulse of voltage which controls the time of application of the unidirectional voltage to the load. A second gas switch tube connects one element of the first switch tube to a second source of voltage. A second short pulse actuates the second switch tube which causes the first switch tube to be rendered nonconducting with subsequent removal of voltage from the load.

For a better understanding of the invention, together with other and further objects thereof, reference is had to the following description taken in connection with the accompanying drawing which shows schematically one embodiment of the invention.

Referring now to the drawing, there is shown a gas switch tube 11 connected in series with a unidirectional voltage source 12 and a load 13. The tube 11 as shown is a tetrode but may be any conventional gas tube having a cathode 14, an anode 15, and a control grid 16. The source 12 may be a battery, capacitor or other desired type of voltage supply. As shown in the drawing, the source 12 comprises a tube 21 in series with a parallel combination of a resistor 22 and a capacitor 23. The amplitude of the unidirectional voltage output of the source 12 may be varied in any desired manner by variation of the voltage on control grid 24 of the tube 21. The load 13 may be any desired load. As shown, the load 13 consists of a coil 25 which might be the deflection coil of a cathode ray tube. As is well understood in the art, if the voltage applied to the load 13 is a square wave, the current through a theoretically resistanceless coil will have a sawtooth waveform, and the resulting deflection of the beam of a cathode ray tube will be linear. The particular source and load here shown are not to be taken as limitations of the invention. A second switch tube 31 is connected in series with a resistor 32 between a positive voltage B+ and the cathode 14 of tube 11. A capacitor 33 is connected between ground and the junction of the tube 31 and resistor 32. The tube 31 is similar to the tube 11, having a cathode 34, an anode 35 and a control grid 36. A pulse source 41 connects to the grid 16 of tube 11 and to the grid 36 of tube 31.

Before a pulse is applied from the source 41 to the grid 16, the tube 11 is essentially an open circuit in series with the source 12 and load 13, and the voltage across the load 13 is substantially zero. At the instant it is desired to apply voltage to load 13, a pulse from source 41 is applied to the grid 16, rendering the tube 11 conducting. As is well understood in the art, once a gas-filled tube is in a conducting state, the grid voltage is practically negligible in effect. Therefore, the initiating pulse may be made very short for more precise control of the starting time of the square wave which is to be applied to the load 13. After a period of time which equals the desired duration of the square wave, a second pulse from the source 41 is applied to the grid 36 of tube 31. The anode 35 of tube 31 is substantially at B+, and since the impedance of the tube 31 is small when conducting, the cathode 14 of tube 11 is raised momentarily toward B+. When the potential of the cathode 14 exceeds the potential of the anode 15, the tube 11 is rendered non-conducting with subsequent removal of voltage from the load 13. The size of the resistor 32 and capacitor 33 are properly adjusted so that the voltage applied to the cathode 14 and load 13 through the tube 31 persists only long enough to cut off tube 11 and not long enough to substantially affect the voltage across the load. Again the initiating pulse to tube 31 may be made very short for purposes of precision without otherwise affecting the operation of the device.

While there has been described what is at present considered the preferred embodiment of the invention, it will be obvious to those skilled in the art that various changes and modifications may be made therein without departing from the invention.

What is claimed is:

An electronic square wave signal generator comprising first and second gas tubes, each having at least an anode, a control grid and a cathode, a source of variable unidirectional voltage having its positive terminal connected to the anode of said first tube, loading means connected between the negative terminal of said source and the cathodes of both tubes, the anode of the second tube being connected to the positive terminal of a second source of voltage through a resistor, and to the negative terminal of said second source through a capacitor, a source of periodic pairs of pulses, means for supplying the first pulse of each of said pairs to the control grid of the first tube and the second pulse of each of said pairs to the control grid of the second tube, said first pulse rendering the first tube conductive, said second pulse rendering the second tube conductive, whereby said first tube is cut off, the duration of the application of the unidirectional voltage to the loading means being fixed by the interval between the pulses of each pair, and the periodicity of the application of the unidirectional voltage to the loading means being fixed by the frequency of said source, the amplitude of the square wave output developed across the loading means being variable in successive output pulses in response to variation in said unidirectional voltage.

LAWRENCE H. JOHNSTON.

REFERENCES CITED

The following references are of record in the file of this patent:

UNITED STATES PATENTS

| Number | Name | Date |
| --- | --- | --- |
| 2,147,472 | Ulrey | Feb. 14, 1939 |
| 2,265,825 | Urtel | Dec. 9, 1941 |
| 2,292,100 | Bliss | Aug. 4, 1942 |
| 2,348,555 | Mathes | May 9, 1944 |

OTHER REFERENCES

Maddock, A. J., "Some Useful Circuits Employing Thyratrons and Ignitrons," Journal of Scientific Instruments, vol. 20, March 1943, page 40. (Copy in Div. 10.)